(12) United States Patent
Amano

(10) Patent No.: US 10,039,038 B2
(45) Date of Patent: Jul. 31, 2018

(54) COMMUNICATION APPARATUS, METHOD OF CONTROLLING COMMUNICATION APPARATUS, AND STORAGE MEDIUM

(71) Applicant: CANON KABUSHIKI KAISHA, Tokyo (JP)

(72) Inventor: Ryosuke Amano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 66 days.

(21) Appl. No.: 14/500,728

(22) Filed: Sep. 29, 2014

(65) Prior Publication Data

US 2015/0099512 A1    Apr. 9, 2015

(30) Foreign Application Priority Data

Oct. 4, 2013  (JP) ................................ 2013-209216

(51) Int. Cl.
  *H04W 36/14*  (2009.01)
  *H04W 4/00*   (2018.01)
  *H04N 1/00*   (2006.01)
  *H04W 4/80*   (2018.01)
  *H04W 36/00*  (2009.01)
  *H04W 84/12*  (2009.01)

(52) U.S. Cl.
  CPC ........ *H04W 36/14* (2013.01); *H04N 1/00307* (2013.01); *H04W 4/80* (2018.02); *H04W 36/0055* (2013.01); *H04N 2201/006* (2013.01); *H04N 2201/0075* (2013.01); *H04N 2201/0084* (2013.01); *H04N 2201/0094* (2013.01); *H04W 84/12* (2013.01)

(58) Field of Classification Search
  CPC ..... H04W 4/003; H04W 4/005; H04W 4/006; H04W 4/008; H04W 4/08; H04W 4/18; H04W 4/185; H04W 4/20; H04W 12/04; H04W 12/06; H04W 12/08; H04W 28/06; H04W 28/18; H04W 72/00; H04W 76/02; H04W 76/023; H04W 84/10; H04W 84/12; H04W 84/18
  See application file for complete search history.

(56) References Cited

U.S. PATENT DOCUMENTS 8,224,246 B2 *  7/2012  Suumaki et al. ............ 455/41.1
8,385,823 B2 *  2/2013  Naniyat ...................... 455/41.1
(Continued)

FOREIGN PATENT DOCUMENTS

JP   2009-207069 A   9/2009
JP   2009-218845 A   9/2009
JP   2011-193474 A   9/2011

*Primary Examiner* — Nizar Sivji
(74) *Attorney, Agent, or Firm* — Canon U.S.A., Inc. IP Division

(57) ABSTRACT

A communication apparatus includes a first communication unit that performs a wireless communication with a second communication apparatus using a first communication method, and a second communication unit that performs a wireless communication with the second communication apparatus using a second communication method different from the first communication method. The first communication unit transmits a message including information indicating a communication protocol to be used in executing a service via the wireless communication by the second communication unit.

21 Claims, 10 Drawing Sheets

(56) References Cited

U.S. PATENT DOCUMENTS

| | | | | |
|---|---|---|---|---|
| 8,583,044 | B2* | 11/2013 | Dua | G06F 17/30058 340/10.51 |
| 2013/0107131 | A1* | 5/2013 | Barnett | G08C 17/02 348/734 |
| 2013/0185745 | A1* | 7/2013 | Zheng | H04N 21/25875 725/25 |
| 2014/0063537 | A1* | 3/2014 | Nishikawa | H04W 4/008 358/1.15 |
| 2014/0073244 | A1* | 3/2014 | Ko | H04W 4/008 455/41.1 |
| 2014/0085676 | A1* | 3/2014 | Kishimoto | H04N 1/00233 358/1.15 |
| 2014/0096202 | A1* | 4/2014 | Matsuda | H04W 4/008 726/4 |
| 2014/0176991 | A1* | 6/2014 | Yun | H04W 4/008 358/1.15 |
| 2014/0355061 | A1* | 12/2014 | Asai | H04N 1/00307 358/1.15 |
| 2015/0062022 | A1* | 3/2015 | Rabii | G06T 1/20 345/173 |
| 2015/0071147 | A1* | 3/2015 | Yamaura | H04M 1/7253 370/311 |

* cited by examiner

COMMUNICATION APPARATUS, METHOD OF CONTROLLING COMMUNICATION APPARATUS, AND STORAGE MEDIUM

BACKGROUND

Field

Aspects of the present invention generally relate to a communication apparatus having a wireless communication capability, a method of controlling a communication apparatus, and a storage medium.

Description of the Related Art

In recent years, in portable telephone apparatuses or the like, it has been started to use a short range communication technique such as NFC (Near Field Communication), IrDA (Infrared Data Association), TransferJet™, and the like. Use of this technique makes it possible to easily perform transmission/reception of data between apparatuses via a short range communication, in which a user needs only to place the apparatuses at close locations. A technique is known to switch the communication method from a short range wireless communication such as that described above to a different wireless communication method such as a wireless LAN communication method (according to the IEEE802.11 series standard), a Bluetooth™ communication method, or the like (Japanese Patent Laid-Open No. 2011-193474). This technique is called a handover technique.

There is a known communication protocol (a service discovery protocol) that allows a communication apparatus to search for a service provided by another communication apparatus via a network, or allows a communication apparatus to notify another communication apparatus of a service provided by the former communication apparatus. Examples of such communication protocols include Simple Service Discovery Protocol (SSDP), Multicast Domain NameSystem (mDNS), and the like.

The service discovery protocol described above is generally executed using a communication method such as a wireless LAN communication method or the like after the handover is performed. Therefore, even in a case where a first apparatus, with which a second apparatus is trying to start communicating, is not capable of executing a communication service desired by the second apparatus, the second apparatus recognizes that the first apparatus is not capable of executing the communication service desired by the second apparatus after the second apparatus performs handover from an NFC connection to a wireless LAN connection. That is, in the conventional technique, there is a possibility that useless handover processing is performed in trying to communicate with an apparatus that is not capable of executing a desired communication service.

SUMMARY OF THE INVENTION

In view of the above, aspects of the present invention generally provide a technique of preventing unnecessary handover processing from occurring.

According to an aspect of the present disclosure, a communication apparatus includes a first communication unit configured to perform a wireless communication with a second communication apparatus using a first communication method, and a second communication unit configured to perform a wireless communication with the second communication apparatus using a second communication method different from the first communication method, wherein the first communication unit transmits a message including information indicating a communication protocol to be used in executing a service via the wireless communication by the second communication unit.

Further features of the present disclosure will become apparent from the following description of exemplary embodiments with reference to the attached drawings.

DESCRIPTION OF THE EMBODIMENTS

Figure 1:
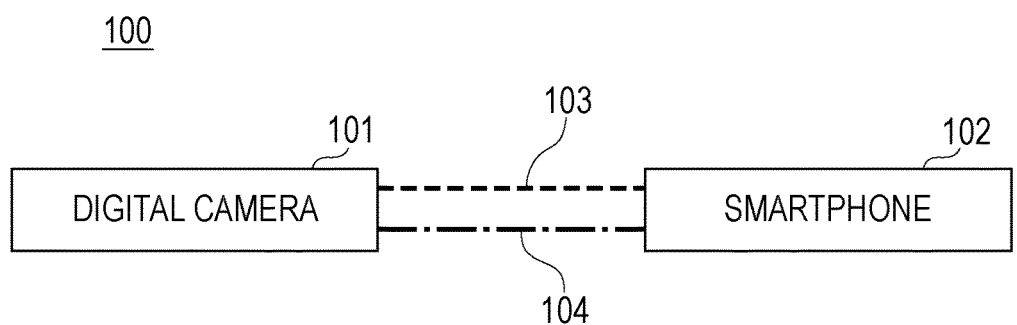
FIG. 1 is a diagram illustrating an example of a system configuration according to an embodiment.

A communication apparatus and a communication system according to embodiments are described below with reference to accompanying drawings. FIG. 1 is a diagram illustrating an example of a device configuration of a system 100 according to an embodiment. Reference numerals 101 and 102 denote communication apparatuses. In the present embodiment, the communication apparatus 101 is by way of example a digital camera and the communication apparatus 102 is by way of example a smartphone. The digital camera 101 and the smartphone 102 are capable of communicating with each other using NFC communication 103 or wireless LAN communication 104.

Figure 2:
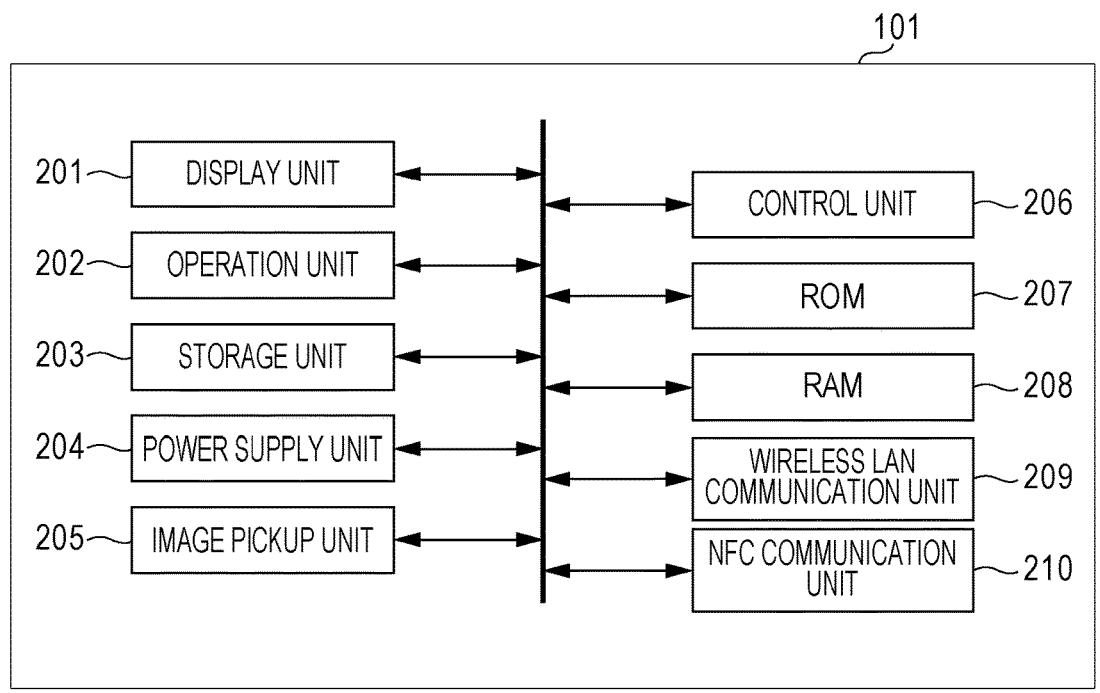
FIG. 2 is a diagram illustrating an example of a hardware configuration of a communication apparatus (a digital camera) according to an embodiment.

FIG. 2 is a diagram illustrating an example of a hardware configuration of the digital camera 101.

The digital camera 101 includes a display unit 201, an operation unit 202, a storage unit 203, a power supply unit 204, an image pickup unit 205, a control unit 206, a ROM 207, a RAM 208, a wireless LAN communication unit 209, and an NFC communication unit 210.

The display unit 201 may be realized using, for example, an LCD, an LED, or the like such that the display unit 201 has a function of outputting visually perceivable information thereby displaying a user interface (UI) for an application.

The operation unit 202 is used by a user for various kinds of inputting, and has a function of operating the digital camera 101. The storage unit 203 may be realized, for example, using a hard disk drive (HDD), such that it is allowed to store and manage information associated with a wireless communication network, information associated with transmission/reception of data, various kinds of data such as image data, and the like. The power supply unit 204 may be, for example, a battery, configured to serve as a power supply for supplying electric power to each part of hardware thereby making it possible for the apparatus as a whole to operate. The image pickup unit 205 includes an image sensor, a lens, and the like and is configured to take a still image or a moving image. The control unit 206 is, for example, a central processing unit (CPU) and is configured to control operations of constituent elements of the digital camera 101. The ROM 207 stores a control program including a control command. Operations described below are realized by the control unit 206 by executing the control program stored in the ROM 307. The RAM 208 is used as a work memory in executing the control program or is used to temporarily store data. A wireless LAN communication unit 209 performs wireless LAN communication 104 according to IEEE802.11 series standards. Although in the present embodiment, it is assumed by way of example that the wireless LAN communication unit 209 performs wireless communication according to the IEEE802.11 series standards, the wireless communication may be performed according to other communication methods such as the Bluetooth™ communication method or the like. An NFC communication unit 210 performs NFC communication 103, that is, the NFC communication unit 210 performs wireless communication according to an NFC (Near Field Communication) standard. When the NFC communication unit 210 detects an apparatus having an NFC communication capability within a communication service range, the NFC communication unit 210 automatically establishes the NFC communication 103. Although it is assumed by way of example that the NFC communication unit 210 performs wireless communication according to the NFC standard, it may be allowed to use other communication methods that allow communication within a service range shorter than that supported by the communication method used by the wireless LAN communication unit 209. Alternatively, the NFC communication unit 210 may use other communication methods that support a communication speed slower than is supported by the communication method used by the wireless LAN communication unit 209.

Figure 3:
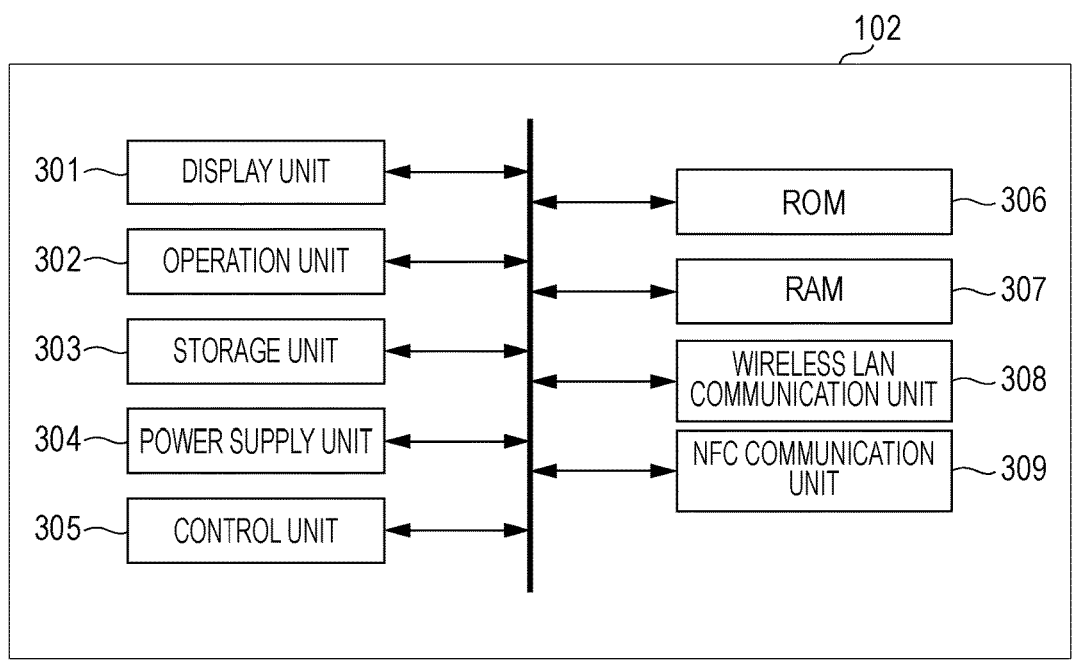
FIG. 3 is a diagram illustrating an example of a hardware configuration of a communication apparatus (a smartphone) according to an embodiment.

FIG. 3 is a diagram illustrating an example of a hardware configuration of the smartphone 102. Component parts thereof are similar to those of the digital camera 101, and thus a further description thereof is omitted.

Next, referring to FIGS. 4 and 5, functional blocks of the digital camera 101 and the smartphone 102 are described below. In the present embodiment, the functional blocks of the digital camera 101 and the smartphone 102 are respectively realized by the control unit 206 and the control unit 305 by executing programs respectively stored in the ROM 207 and the ROM 307. That is, the control units 206 and 207 control various parts of hardware and perform operations and processes on information thereby realizing the respective functions. Note that part or all of the functional blocks may be realized by hardware. In this case, part or all of the functional blocks may be realized, for example, using ASICs (application specific integrated circuits).

Figure 4:
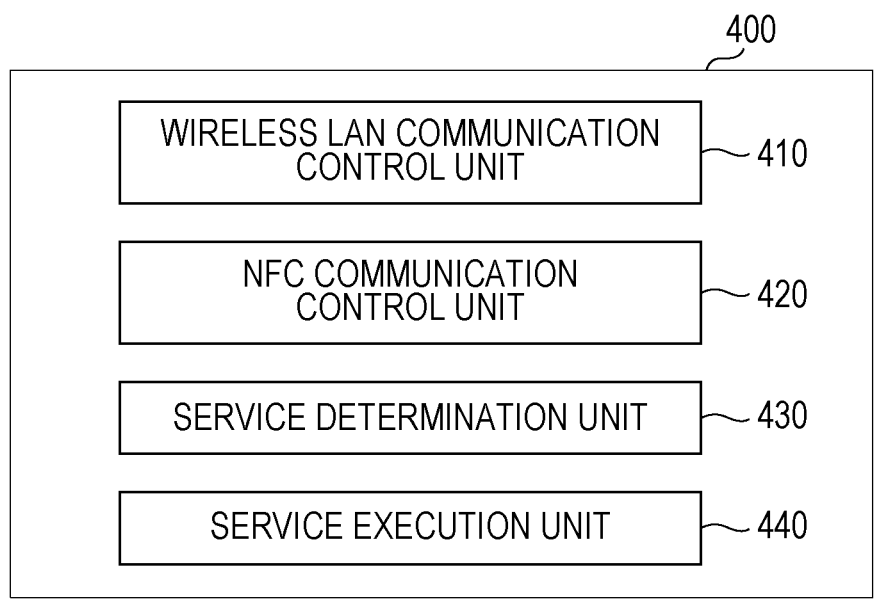
FIG. 4 is a diagram illustrating an example of a functional block configuration of a communication apparatus (a digital camera) according to an embodiment.

FIG. 4 is a functional block diagram (400) of the digital camera 101. The digital camera 101 includes a wireless LAN communication control unit 410, an NFC communication control unit 420, a service determination unit 430, and a service execution unit 440.

The wireless LAN communication control unit 410 is a processing unit configured to control wireless LAN communication via the wireless LAN communication unit 209. The wireless LAN communication control unit 410 has two functions: a station function in which the wireless LAN communication control unit 410 operates as a wireless LAN terminal; and an access point (AP) function in which the wireless LAN communication control unit 410 operates as a base station. The NFC communication control unit 420 is a processing unit configured to control NFC communication via the NFC communication unit 210. The service determination unit 430 is a processing unit configured to manage services or protocols executed by the digital camera 101 using the wireless LAN communication control unit 410 and determine a service or a protocol to be executed. More specifically, the service determination unit 430 manages service information such an identifier of a service, a protocol corresponding to the service, an identifier of a role in executing the protocol, and the like. The service execution unit 440 executes a service according to a result of the determination performed by the service determination unit 430. In the present embodiment, the digital camera 101 is capable of executing an "image transfer" service. To execute this service, the digital camera 101 supports two protocols, that is, "image transfer protocol A" and "image transfer protocol B". Each protocol provides two roles, that is, a role of a server that provides a service, and a role of a client that executes a service. The digital camera 101 is assumed by way of example to be capable of operating as the server of the protocol. It is further assumed by way of example that the digital camera 101 is capable of providing a "function A-1" and "function A-2" which are functions provided by the server of an image transfer protocol A and is also capable of providing a "function B-1" which is a function provided by the server of an image transfer protocol B.

Note that the protocol defines specifications of a communication procedure or a content of communication between a client and a server when a service is executed. An example of a protocol is a UPnP-AV (Universal Plug and Play Audio Visual) standard. Examples of servers of the protocol include a media server of UPnP-AV, a media renderer of UPnP-AV, and the like. An example of a client is a control point of UPnP-AV. Examples of functions provided by a server of a protocol include Content Directory, AV-Transport and the like defined by UPnP-AV. Subfunctions may be managed in units of actions provided by Content Directory or AV-Transport. The identifier of a service is an integer value uniquely related to the service. The identifier of a protocol is an integer value uniquely related to the protocol with individually defined specifications. The identifier of a role is an integer value uniquely related to the role in executing a protocol.

The service information may further include information transmitted/received using a communication protocol such as SSDP (Simple Service Discovery Protocol), mDNS (Multicast DNS), or the like.

Figure 5:
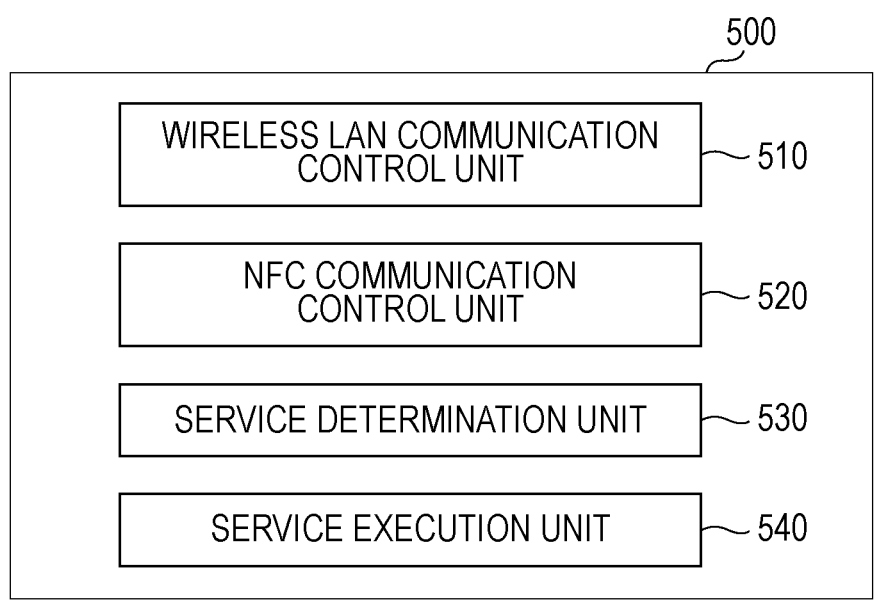
FIG. 5 is a diagram illustrating an example of a functional block configuration of a communication apparatus (a smartphone) according to an embodiment.

FIG. 5 is a functional block diagram (500) of the smartphone 102. As with the digital camera 101, the smartphone 102 includes a wireless LAN communication control unit 510, an NFC communication control unit 520, a service determination unit 530, and a service execution unit 540. The smartphone 102 is capable of executing an "image transfer" service. To execute this service, the smartphone 102 supports two protocols: "image transfer protocol A"; and "image transfer protocol B".

An operation of the communication system configured in the above-described manner is described below.

First Embodiment

Referring to flow charts illustrated in FIG. 6 and FIG. 7, an operation procedure of the digital camera 101 and that of the smartphone 102 according to a first embodiment are described below.

Figure 6:
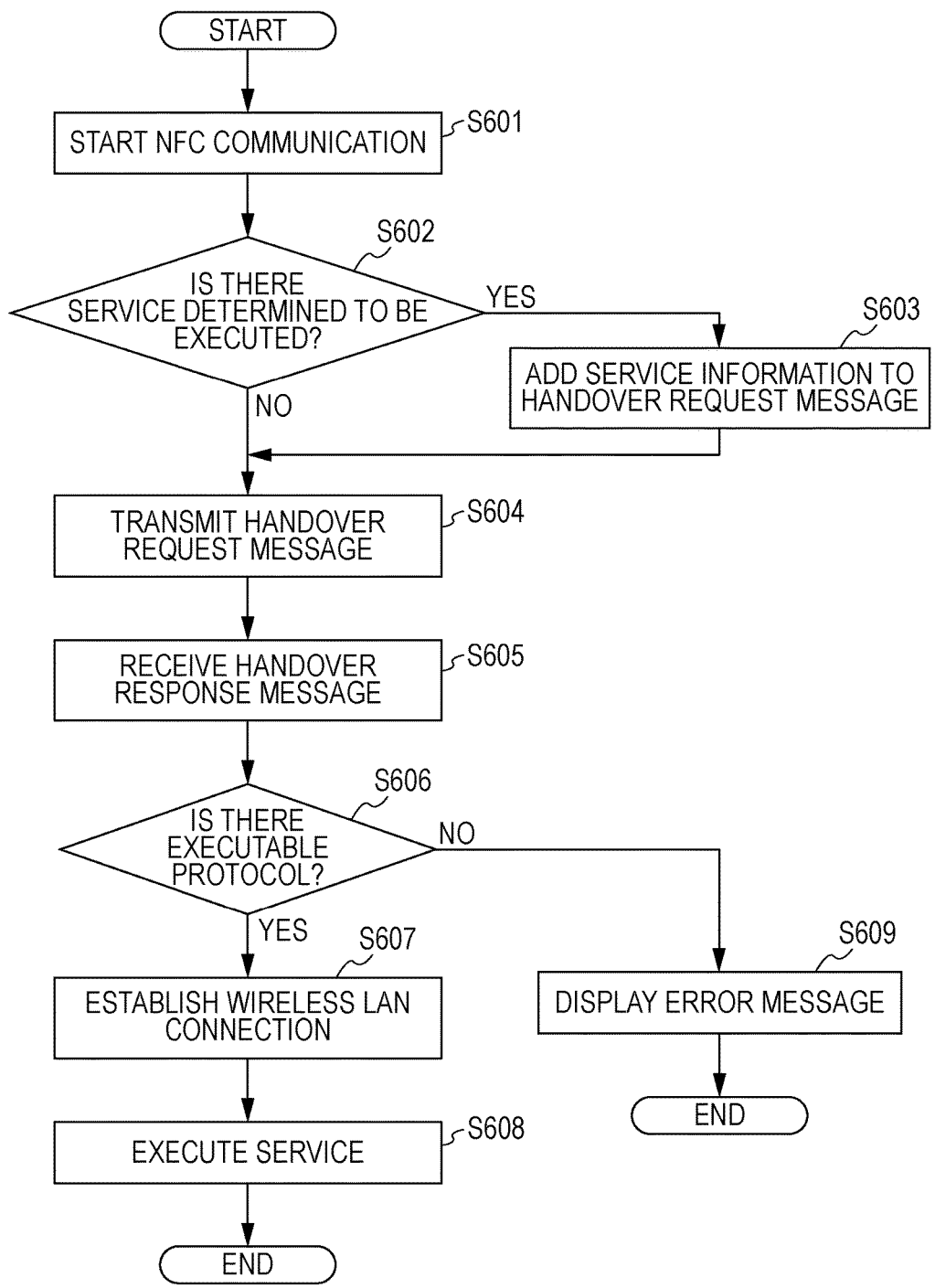
FIG. 6 is a diagram illustrating an operation flow of a communication apparatus (a digital camera) according to a first embodiment.

The flow chart of FIG. 6 illustrates an operation procedure of the digital camera 101 for a case where the digital camera 101 and the smartphone 102 are placed closely by a user.

When the NFC communication control unit 420 of the digital camera 101 detects approaching of the NFC communication unit 309 of the smartphone 102, the NFC communication control unit 420 establishes NFC communication with the smartphone 102 (S601).

Next, the control unit 206 of the digital camera 101 determines whether there is a service determined to be executed between digital camera 101 and the smartphone 102 (S602). In the present embodiment, the determination of a service to be executed is performed via a user operation accepted by the operation unit 202. The determination in S602 depends on a user operation performed before the digital camera 101 starts the NFC communication. That is, the determination in S602 is performed based on whether connecting of the digital camera 101 to the smartphone 102 via the NFC communication unit 210 is made in a state in which a service to be executed by the digital camera 101 has already been selected or not.

In the case where a service determined to be executed between the digital camera 101 and the smartphone 102 has already been selected (YES in S602), the digital camera 101 adds service information to a handover request message (S603), and transmits it to the smartphone 102 (S604).

The handover request message is a message for requesting a connection parameter necessary to newly make a connection using a communication method different from NFC. The handover request message may include additional information associated with another service or the like in addition to the service information. For example, information indicating an encoding format for a file to be printed, a print sheet size, a print color, information indicating whether duplex printing is specified, and/or the like may be added and transmitted. Furthermore, the handover request message may include information associated with a wireless communication interface used in executing the service. The information associated with the wireless communication is information indicating a communication method such as the wireless LAN communication method, the Bluetooth™ communication method, or the like to which to perform a handover.

In the following description, let it be assumed by way of example that the transmitted handover request message includes information indicating that an "image transfer" service is requested by the digital camera 101, wireless LAN is specified as a connection method, and "image transfer protocol A" and "image transfer protocol B" are supported as protocols. It is further assumed by way of example that the handover request message also includes information indicating that the roles of both protocols are "server", functions in the "image transfer protocol A" are "function A-1" and "function A-2", and the function in the "image transfer protocol B" is "function B-1". Note that in the present embodiment, the handover request message is a handover request message according to the NFC Forum Connection Handover Technical Specification.

The NFC communication control unit 420 then receives a handover response message from the smartphone 102 via the NFC communication (S605), and analyzes the content of the message. In the present embodiment, the handover response message is a handover select message according to the NFC Forum Connection Handover Technical Specification. Furthermore, the handover response message further includes information indicating a protocol and a role executable by the smartphone 102 among protocols and roles included in the handover request message transmitted in S603. In a case where an executable protocol is included in the handover response message (YES in S606), the digital camera 101 makes a connection to a wireless LAN network according to a wireless LAN connection parameter described in the handover response message (S607). Note that the connection parameter is information for connecting a network built as an access point by the smartphone 102. The connection parameter includes at least one or all of a SSID, an encryption key, an encryption method, an authentication key, an authentication method, a Passphrase, and a MAC address of the smartphone 102.

When the wireless LAN communication unit 209 of the digital camera 101 connects to a wireless LAN network based on the acquired connection parameter, the service execution unit 440 executes a service according to the protocol and the role received in S605 (S608). The service by the service determination unit 430 is achieved via communication performed by the wireless LAN communication unit 308 via the wireless LAN network with the acquired connection parameter. In a case where the handover response message includes no protocol executable by the smartphone 102 (NO in S606), the service determination unit 430 displays a message on the display unit 201 to notify that execution of the service has failed (S609). Thereafter, the process is ended. Note that the method of notifying of an error is not limited to displaying a message, but the notification of the error may be given, for example, by a vibration of a body of the digital camera 101, via a sound/voice, turning-on of a LED lamp, or the like.

On the other hand, in a case where an NFC connection to the smartphone 102 is established in a state in which no service to be executed by the digital camera 101 is selected (NO in S602), the NFC communication control unit 420 transmits a handover request message including no service information to the smartphone 102 (S604). The NFC communication control unit 420 then receives, from the smartphone 102, a handover response message including information indicating a protocol and a role executable by the smartphone 102 (S605). In a case where the service determination unit 430 determines that a protocol and a role executable by the digital camera 101 are included in protocols and roles described in the received handover response message (YES in S606), the processing flow proceeds to S607. The digital camera 101 makes a connection to the smartphone 101 via wireless LAN (S607), and executes the service (S608). On the other hand, in a case where the received handover response message includes no protocol executable by the digital camera 101 (NO in S606), the service determination unit 430 displays a message on the display unit 201 to notify that execution of the service has failed (S609). Thereafter, the process is ended. Note that the method of notifying of an error in S609, as in S608, is not limited to displaying a message, but the notification of the error may be given, for example, by a vibration of a body of the digital camera 101, via a sound/voice, turning-on of an LED lamp, or the like.

Figure 7:
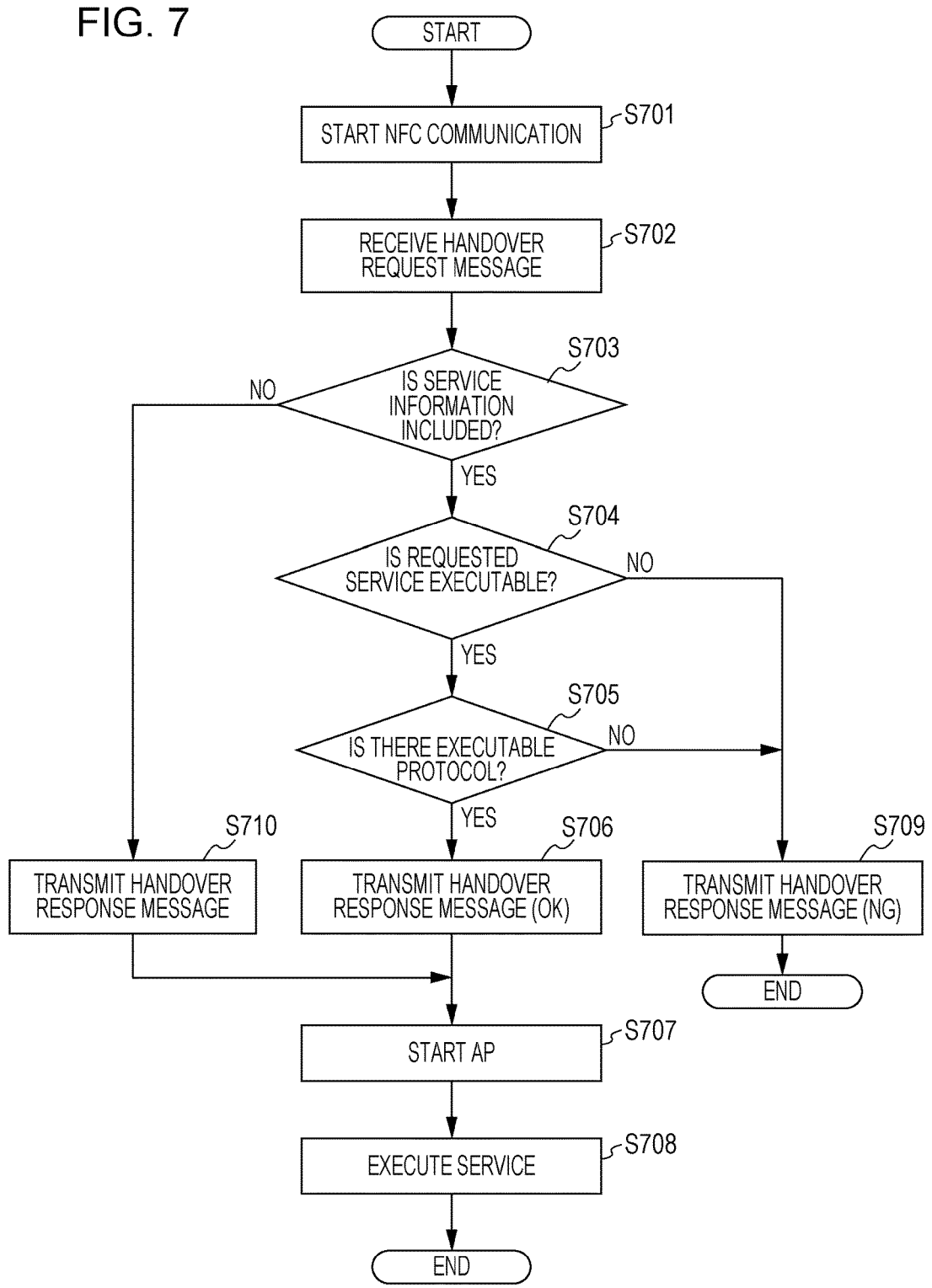
FIG. 7 is a diagram illustrating an operation flow of a communication apparatus (a smartphone) according to the first embodiment.

The flow chart of FIG. 7 illustrates an operation procedure of the smartphone 102 for a case where the digital camera 101 and the smartphone 102 are placed closely by a user.

When the NFC communication control unit 520 of the smartphone 102 detects approaching of the NFC communication unit 210 of the digital camera 101, the NFC communication control unit 520 establishes NFC communication with the digital camera 101 (S701). The NFC communication control unit 520 then receives a handover request message from the digital camera 101 via NFC communication (S702). In a case where the received handover request message includes service information (YES in S703), the service control unit 530 determines whether the service is executable by the service control unit 530 (S704). In a case where the service is executable (YES in S704), the service control unit 530 further determines whether the service control unit 530 is capable of handling a protocol and a role in executing the service (S705). More specifically, for example, in a case where the handover request message includes service information indicating that the digital camera 101 is capable of operating as a server of the image transfer protocol A, if the smartphone 102 is capable of operating as a client of the image transfer protocol A, then it is determined that it is capable of handling the protocol and the role. On the other hand, in a case where the smartphone 102 is not capable of operating as the client of the image transfer protocol A, it is determined that it is not capable of handing the protocol and the role. In a case where it is capable of handling the protocol and the role (YES in S705), the NFC communication control unit 520 adds the identifier of the protocol and the identifier of the role to the handover response message and transmits it to the digital camera 101 (S706). On the other hand, in a case where the service is not executable (NO in S704), the NFC communication control unit 520 adds information indicating that the service is not executable to the handover response message and transmits it to the digital camera 101 (S709). Thereafter the process is ended. In a case where the received handover request message includes no service information (NO in S703), the NFC communication control unit 520 transmits, to the digital camera 101, a handover response message including a protocol and a role executable by the smartphone 102 (S710). Note that the handover response message transmitted in S706 or S710 by NFC communication control unit 520 includes a connection parameter of a wireless LAN network used in executing the service.

The wireless LAN communication control unit 510 then starts the access point function and generates a wireless LAN network corresponding to the connection parameter included in the handover response message (S707). The service execution unit 540 then executes the service according to the protocol and the role transmitted in S706 or S710 (S708).

Figure 8:
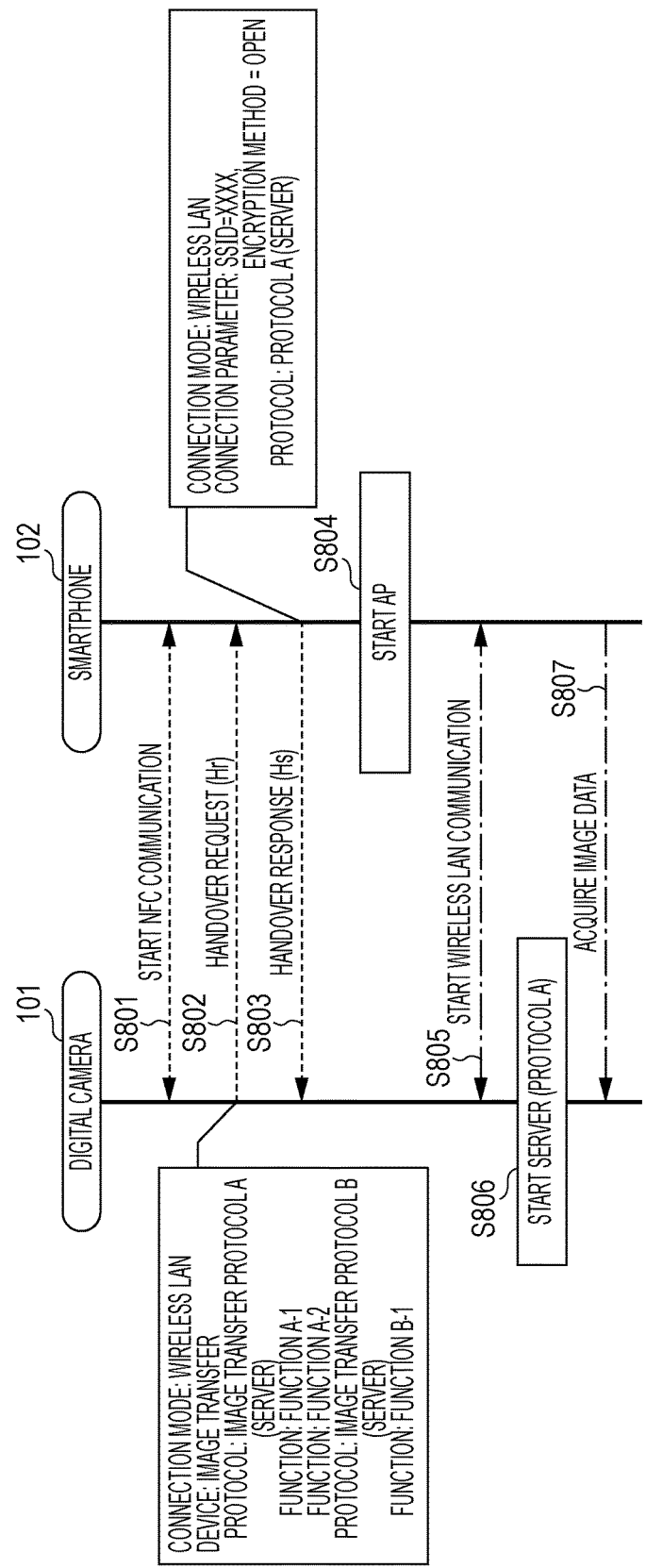
FIG. 8 is a diagram illustrating an example of a communication sequence between a digital camera and a smartphone according to the first embodiment.

Next, referring to FIG. 8, an example of a communication sequence between the digital camera 101 and the smartphone 102 is described in detail below. In FIG. 8, in response to a user operation of placing the digital camera 101 and the smartphone 102 at close locations, NFC communication is established between the digital camera 101 and the smartphone 102 (S801). The digital camera 101 then transmits a handover request message to the smartphone 102 via NFC communication (S802). This handover request message includes added information indicating that the digital camera 101 wants to transfer image data via a wireless LAN communication using a service of "image transfer protocol A" and the "image transfer protocol B". The smartphone 102 transmits a handover response message to the digital camera 101 via NFC communication (S803). This handover response message includes information indicating a protocol and a role supported by the smartphone 102 among protocols and roles included in the received handover request message and further includes a connection parameter of a wireless LAN network generated by the smartphone 102. Herein the information indicating the supported protocol and the role is information indicating the protocol and the role executable by the digital camera 101 in communicating with the smartphone 102. In the example illustrated in FIG. 8, the "server of the image transfer protocol A" is a function supported by the digital camera 101, and information indicating this fact is included in the handover response message. The smartphone 102 then starts the access point function and generates a wireless LAN network corresponding to the connection parameter transmitted in S803 (S804) thereby making a connection to the digital camera 101 (S805). The digital camera 101 starts the server of "image transfer protocol A" (S806), and performs a process to acquire image data from the smartphone 102 (S807). In the image transfer protocol A according to the present embodiment, image data is transmitted between the server and the client in either one of the following manners: the image data is transmitted from the client to the server; or the client acquires the image data from the server. In the example illustrated in FIG. 8, the digital camera 101 operates as the server, and the smartphone 102 operates as the client, and thus in S807 the smartphone 102 acquires image data from the digital camera 101. On the other hand, in a case where the digital camera 101 operates as the client of the image transfer protocol A, image data is transmitted from the smartphone 102 to the digital camera 101. In this case, the handover request message transmitted in S802 includes information indicating that the digital camera 101 is capable of operating as the client in the image transfer protocol A.

In the present embodiment, as described above, service information is added to a handover request message thereby making it possible to share service information between apparatuses before handover is performed. Sharing the service information between apparatuses before the handover makes it possible to suppress unnecessary handover processing in a case where one of the apparatuses does not support the service. Thus, it is allowed to perform the handover from NFC to wireless LAN or Bluetooth™ only when the handover is necessary. In general, it takes several seconds to several ten seconds to establish a wireless LAN connection, and thus suppressing unnecessary handover processing makes it possible to prevent an unnecessary processing time from occurring.

Second Embodiment

Figure 9:
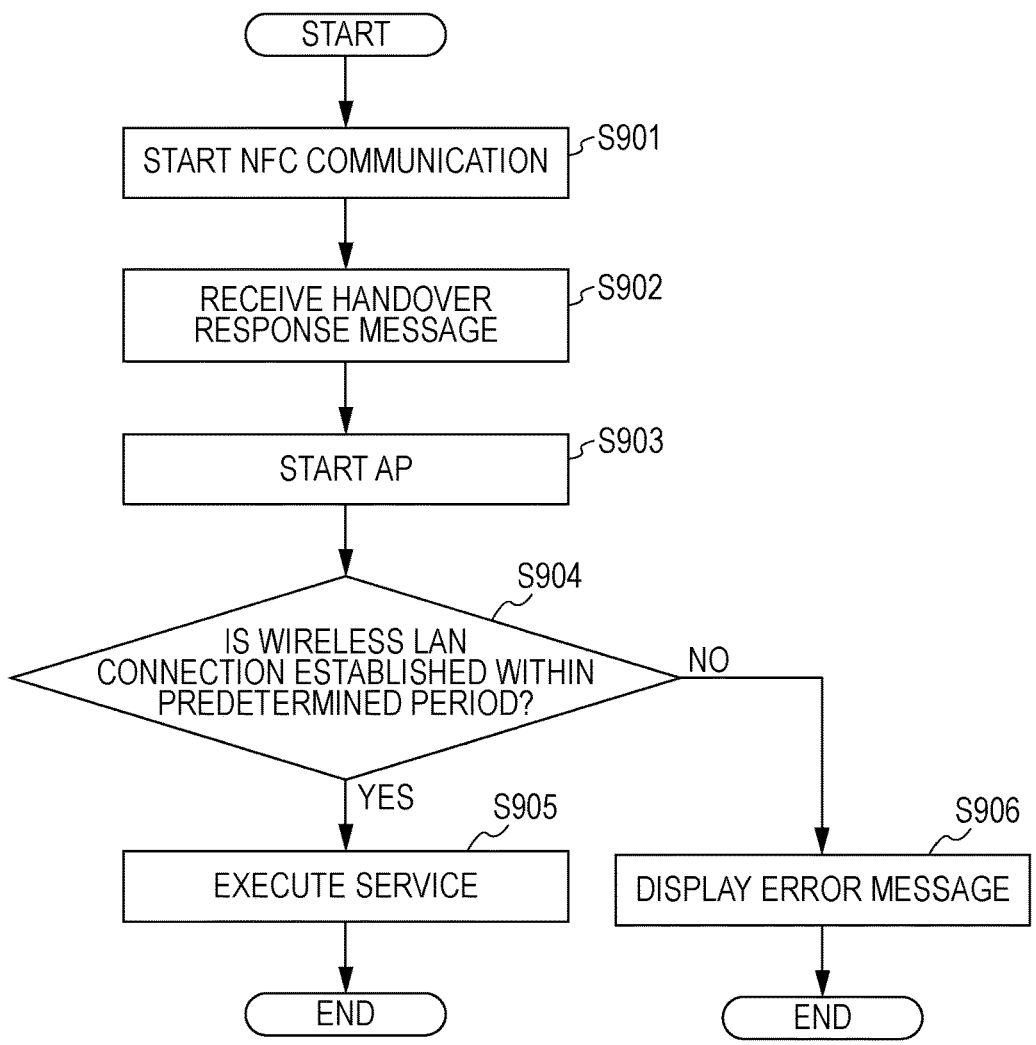
FIG. 9 is a diagram illustrating an operation flow of a communication apparatus (a digital camera) according to a second embodiment.
Figure 10:
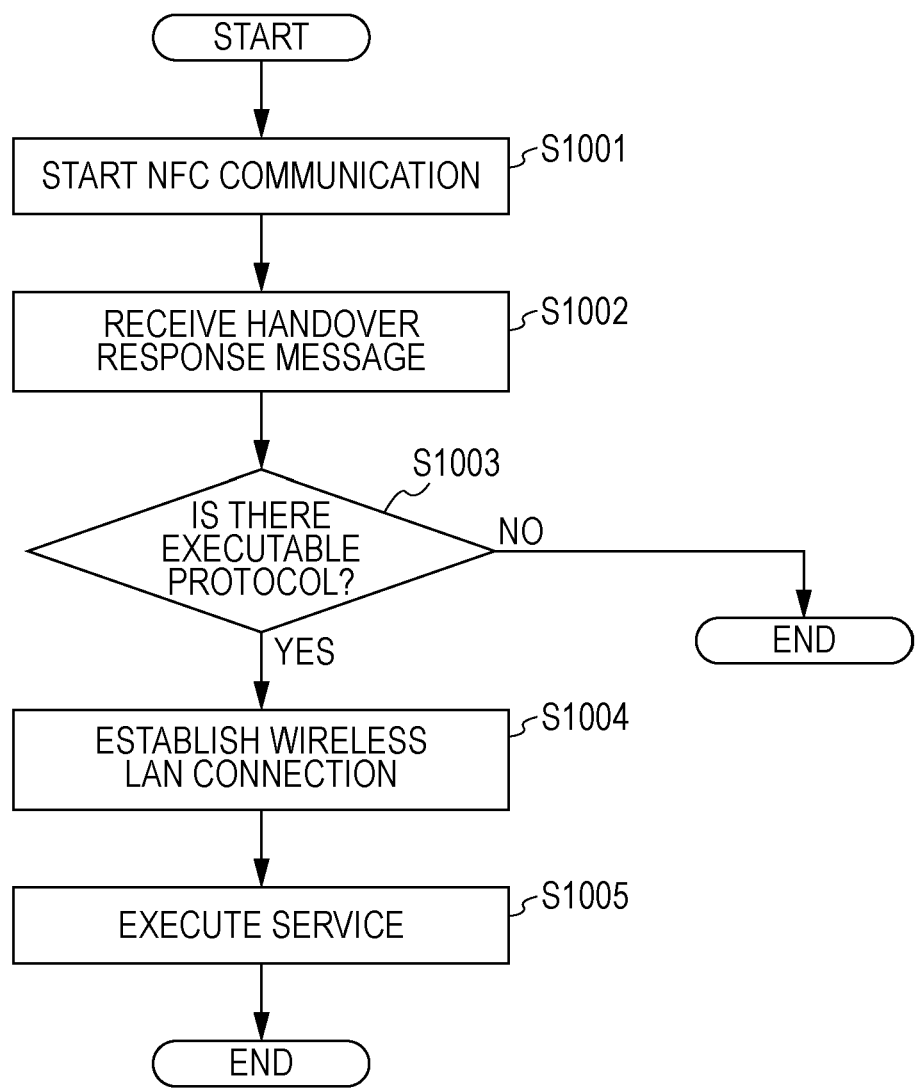
FIG. 10 is a diagram illustrating an operation flow of a communication apparatus (a smartphone) according to the second embodiment.
Figure 11:
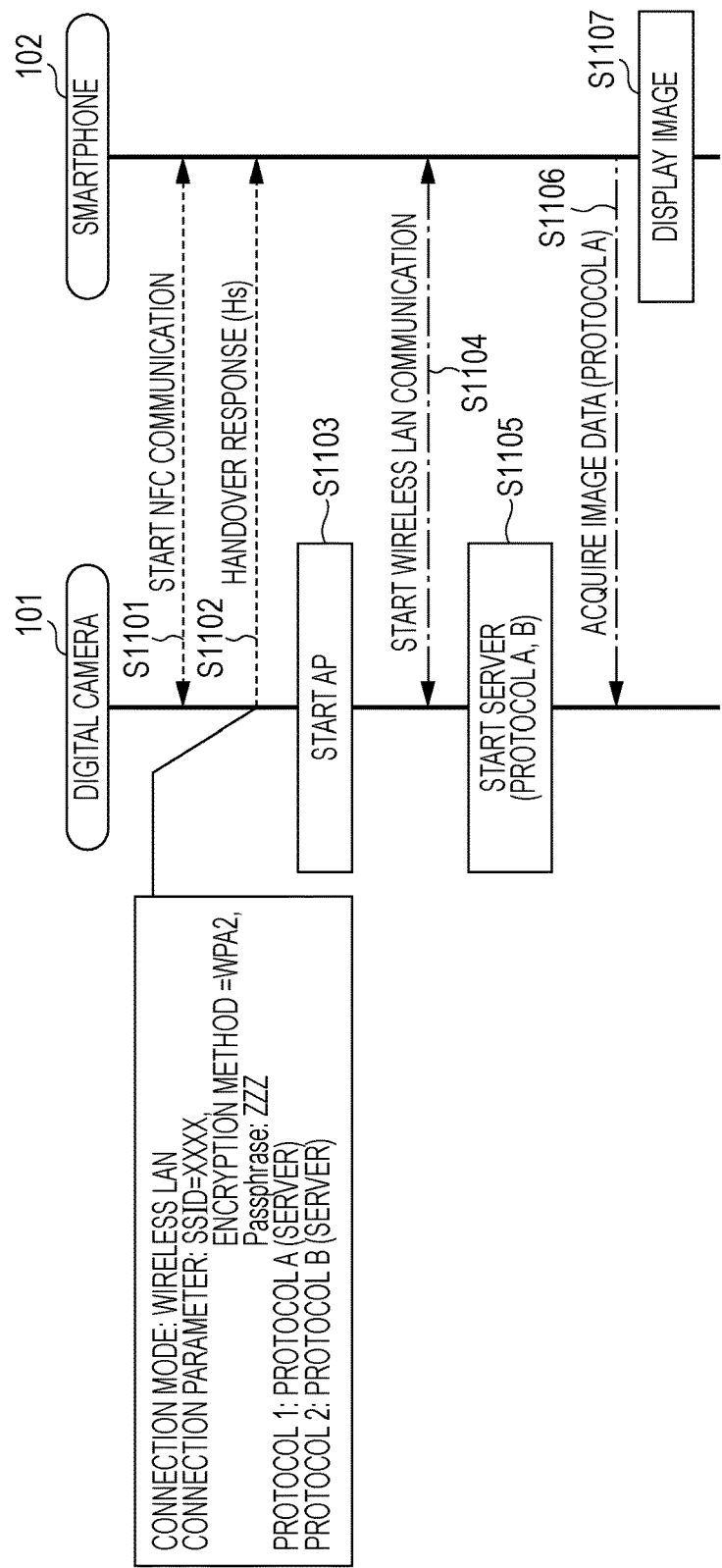
FIG. 11 is a diagram illustrating an example of a communication sequence between a digital camera and a smartphone according to the second embodiment.

In the first embodiment described above, information about services executed via NFC communication is shared, by way of example, by the method in which a first apparatus that is to use a service transmits information indicating services usable by the first apparatus to a second apparatus that is to provide the service. In a second embodiment described below, an apparatus that is to provide a service transmits information about services supported by the apparatus to another apparatus that is to use a service thereby allowing to achieve agreement in terms of the service to be executed. Note that a communication system according to the second embodiment is configured in a similar manner to that according to the first embodiment. Referring to FIGS. 9 to 11, an operation of the communication system according to the second embodiment is described in detail below.

FIG. 9 is a flow chart illustrating an operation procedure of the digital camera 101 for a case where the digital camera 101 and the smartphone 102 are placed closely by a user.

When the NFC communication control unit 420 of the digital camera 101 detects approaching of the NFC communication unit 309 of the smartphone 102, the NFC communication control unit 420 establishes NFC communication with the smartphone 102 (S901). The NFC communication control unit 420 then transmits a handover response message to the smartphone 102 via NFC communication (S902). The handover response message includes a protocol and a role executable by the digital camera 101 and also includes a connection parameter.

The digital camera 101 then starts the access point function using the wireless LAN communication control unit 410 and generates a wireless LAN network corresponding to the connection parameter included in the handover response message (S903). The digital camera 101 waits for a predetermined period of time for the smartphone 102 to connect to the wireless LAN network (S904). In a case where a connection from the smartphone 102 is made within the predetermined period (YES in S904), a service is executed according to the protocol and the role included in the handover response message (S905). On the other hand, in a case where no connection from the smartphone 102 is made within the predetermined period (NO in S904), the digital camera 101 displays an error information (S908).

FIG. 10 is a flow chart illustrating an operation procedure of the smartphone 102 for a case where the digital camera 101 and the smartphone 102 are placed closely. When the NFC communication control unit 520 of the smartphone 102 detects approaching of the NFC communication unit 210 of the digital camera 101, the NFC communication control unit 520 establishes NFC communication with the digital camera 101 (S1001). The NFC communication control unit 520 then receives a handover response message from the digital camera 101 via NFC communication (S1002). The service determination unit 530 determines whether the smartphone 102 is capable of handling a protocol and a role included in the received handover response message (S1003). In a case where it is determined that it is capable of handling them (YES in S1003), the wireless LAN communication control unit 510 makes a connection to a wireless LAN network according to a connection parameter included in the handover response message (S1004), and executes the service (S1005). On the other hand, in a case where it is determined that it is not capable of handling them (NO in S1003), the smartphone 102 ends the process without performing the handover to the wireless LAN.

Next, referring to FIG. 11, an example of a communication sequence between the digital camera 101 and the smartphone 102 is described in detail below.

When the digital camera 101 and the smartphone 102 are placed closely (not illustrated), NFC communication is established between them (S1101). The digital camera 101 transmits, to the smartphone 102, a handover response message including added service information indicating a protocol and a role executable by the digital camera 101 (S1102). In the present embodiment, service information is described to notify that the digital camera 101 is capable of operating as the server of image transfer protocols A and B. The handover response message also includes a connection parameter of a wireless LAN network generated by the digital camera 101. The digital camera 101 then starts the access point function and generates a wireless LAN network according to the wireless LAN network information transmitted in S1102 (S1103), and the digital camera 101 waits for the smartphone 102 to make a connection. When the smartphone 102 receives the handover response message transmitted in S1102, the smartphone 102 searches for the wireless LAN network described in the handover response message and makes a connection to the wireless LAN network (S1104). After the connection to the wireless LAN network is established, the digital camera 101 starts the server of the image transfer protocols A and B according to the service information included in the handover request message (S1105). The smartphone 102 operates as a client of the image transfer protocols A and B and acquires image data (S1106), and displays the acquired image data (S1107).

In the present embodiment, as described above, information representing services capable of being provided is added to a handover select message thereby making it possible to share service information between apparatuses before handover is performed. Sharing the service information between apparatuses before the handover is performed makes it possible to suppress unnecessary handover processing in a case where one of the apparatuses does not support the service. Thus, it is allowed to perform the handover from NFC to wireless LAN or Bluetooth™ only when the handover is necessary. In general, it takes several seconds to several ten seconds to establish a wireless LAN connection, and thus suppressing unnecessary handover processing makes it possible to prevent an unnecessary processing time from occurring.

Note that the embodiments described above are merely exemplary illustrations. It is to be understood that these exemplary illustrations are not seen to be limiting, and various modifications are possible without departing from the scope of the present disclosure.

In the embodiments described above, it is assumed by way of example that the handover is performed from NFC to wireless LAN. Alternatively, the handover from NFC may be performed to another wireless communication method other than wireless LAN, such as Bluetooth™.

In the embodiments described above, it is assumed by way of example that one of communication apparatuses operates as an access point and transmits a connection parameter thereby establishing a wireless LAN communication. Alternatively, communication may be performed via an external access point or may be performed in ad-hoc mode. Still alternatively, wireless LAN communication may be established by performing a connection procedure between communication apparatuses using Wi-Fi Direct.

In the embodiments described above, it is assumed by way of example that the system includes the digital camera 101 and the smartphone 102. Alternatively, the system may include other apparatuses. Examples of apparatuses in the system include a personal computer (PC), a personal digital assistant (PDA) device, a tablet terminal, a printer, a scanner, a multifunction peripheral printer (MFP), a facsimile (FAX) device, digital appliance, an audio-visual (AV) apparatus, and so on.

The service specified by service information transmitted/received between communication apparatuses is not limited to an image transfer service, but other services such as a printing service, a motion image playback service, an image scanning service, and/or the like may be provided. Two or more services may be transmitted/received at a time.

In the embodiments described above, it is assumed, by way of example but not limitation, that when a service included in a handover request message is not executable, information indicating that the service is not executable is incorporated in a handover response message. The information may be given in another method as long as a communication apparatus that transmits a handover request message is capable of detecting that a service included in the handover request message is not executable by an apparatus at a receiving side. For example, the notification may be given by not transmitting a handover response message, or by transmitting a message other than a handover select message.

In the embodiments described above, it is assumed by way of example that the identifier of a service transmitted/received via NFC communication is an integer value uniquely related to the service. Alternatively, the identifier may be text information such as a name of the service. The identifier may be identification information related to a set of a plurality of services.

In the embodiments described above, it is assumed by way of example that information indicating a service executable by an apparatus is included in a handover request message. Alternatively, information about other services such as a service not executable by the apparatus may be included in the handover request message.

In the embodiments described above, it is assumed by way of example that handover is performed from NFC to another communication method. Alternatively, handover may be performed from a communication method other than NFC, such as Bluetooth™ or the like to a communication method such as wireless LAN or the like. That is, in handover from a first communication method to a second communication method, the first and second communication methods are not limited to NFC, Bluetooth™, and wireless LAN, but various kinds of communication methods may be employed. In this situation, the first communication method may be a wireless communication method whose service range is shorter than a service range supported by the second communication method, and the second communication method may be a wireless communication method that supports a higher communication rate than is supported by the first communication method.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-209216, filed Oct. 4, 2013, which is hereby incorporated by reference herein in its entirety.

What is claimed is:

1. A communication apparatus comprising:
   at least one processor; and
   a memory;
   the processor being configured to run a program stored in the memory for implementation of units, including
   an NFC (Near Field Communication) control unit configured to perform a wireless communication with another communication apparatus using NFC communication; and
   a wireless LAN (Local Area Network) communication unit configured to perform a wireless communication with said another communication apparatus using wireless LAN communication,
   wherein the NFC control unit transmits a message to said another communication apparatus, the message including
   information indicating the wireless LAN communication,
   information indicating an image transfer service performed using the wireless LAN communication, and
   an image transfer protocol being a protocol of an upper layer than the wireless LAN,
      wherein, in a case where the NFC control unit receives, from said another communication apparatus, a request message including information indicating an image transfer protocol that is executable by the communication apparatus, the NFC control unit transmits a select message including information indicating the image transfer protocol to said another communication apparatus,
   wherein, in a case where the NFC control unit receives, from said another communication apparatus, a request message including information indicating an image communication protocol that is not executable by the communication apparatus, the NFC control unit transmits a select message indicating that the image transfer protocol is not executable, and
   wherein, after the NFC control unit has transmitted the message to said another communication apparatus, the wireless LAN communication unit communicates with said another communication apparatus using the image transfer protocol included in the message to transmit image data, without executing a service discovery.

2. The communication apparatus according to claim 1, wherein the message includes information indicating a plurality of communication protocols.

3. The communication apparatus according to claim 1, wherein the message includes information indicating a role of the communication apparatus in executing the image transfer service using the image transfer protocol.

4. The communication apparatus according to claim 3, wherein the information indicating the role is information indicating that the communication apparatus is capable of operating as a client and/or a server in the image transfer protocol in executing the image transfer service.

5. The communication apparatus according to claim 1, further comprising a controller configured to perform a determination, based on a message received from said another communication apparatus using the NFC control unit, whether to perform communication with said another communication apparatus using the wireless LAN communication unit.

6. The communication apparatus according to claim 5, wherein the controller performs the determination such that in a case where the message received from said another communication apparatus by the NFC control unit includes information indicating the image transfer protocol executable by the communication apparatus, the controller determines that the communication using the wireless LAN communication unit is to be performed.

7. The communication apparatus according to claim 5, further comprising a display configured to display information indicating an error in a case where the controller determines that the communication using the wireless LAN communication unit is not to be performed.

8. The communication apparatus according to claim 1, wherein the message is a handover request message or a handover select message.

9. The communication apparatus according to claim 1, wherein the message includes a connection parameter, wherein the connection parameter includes at least one of an SSID (Service Set Identifier), an encryption key, an encryption method, an authentication key, an authentication method, and a MAC (Media Access Control) address.

10. The communication apparatus according to claim 1, wherein, the select message is a handover select message.

11. The communication apparatus according to claim 1, wherein the message transmitted by the NFC control unit to said another communication apparatus further includes identification information about the image transfer service.

12. The communication apparatus according to claim 1, wherein the image transfer protocol is Universal Plug and Play Audio Visual (UPnP-AV).

13. The communication apparatus according to claim 1, wherein the wireless LAN communication unit starts communication as an access point according to the transmission of the message.

14. The communication apparatus according to claim 13, wherein, in a case where there is no connection from said another communication apparatus after the wireless LAN communication unit has started the communication as the access point, the wireless LAN communication unit terminates communication processing.

15. The communication apparatus according to claim 1, wherein the wireless LAN communication unit communicates image data with said another communication apparatus using the image transfer protocol.

16. A method of controlling a communication apparatus comprising an NFC (Near Field Communication) control unit configured to perform a wireless communication with another communication apparatus using NFC communication; and a wireless LAN (Local Area Network) communication unit configured to perform a wireless communication with said another communication apparatus using wireless LAN communication, the method comprising:
   transmitting, by the NFC control unit, to said another communication apparatus, a message including information indicating the wireless LAN communication, information indicating an image transfer service performed using the wireless LAN communication, and the image transfer protocol being a protocol of an upper layer than the wireless LAN,
   transmitting, in a case where the NFC control unit receives, from said another communication apparatus, a request message including information indicating an image transfer protocol that is executable by the communication apparatus, a select message including information indicating the image transfer protocol to said another communication apparatus, and
   transmitting, in a case where the NFC control unit receives, from said another communication apparatus, a request message including information indicating an image communication protocol that is not executable by the communication apparatus, a select message indicating that the image transfer protocol is not executable,
   wherein, after the NFC control unit has transmitted the message to said another communication apparatus, the wireless LAN communication unit communicates with said another communication apparatus using the image transfer protocol included in the message to transmit image data, without executing a service discovery.

17. The method according to claim 16, wherein the message includes information indicating a plurality of communication protocols.

18. The method according to claim 16, wherein the message includes information indicating a role of the communication apparatus in executing the image transfer service using the image transfer protocol.

19. A non-transitory computer-readable storage medium storing computer executable instructions configured to cause a computer to execute a method of controlling a communication apparatus comprising an NFC (Near Field Communication)control unit configured to perform a wireless communication with another communication apparatus using NFC communication; and a wireless LAN communication unit configured to perform a wireless communication with said another communication apparatus using wireless LAN communication, the method comprising:
   transmitting, by the NFC control unit, to said another communication apparatus, a message including information indicating the wireless LAN communication, information indicating an image transfer service performed using the wireless LAN communication, and the image transfer protocol being a protocol of an upper layer than the wireless LAN, transmitting, in a case where the NFC control unit receives, from said another communication apparatus, a request message including information indicating an image transfer protocol that is executable by the communication apparatus, a select message including information indicating the image transfer protocol to said another communication apparatus, and
   transmitting, in a case where the NFC control unit receives, from said another communication apparatus, a request message including information indicating an image transfer protocol that is not executable by the communication apparatus, a select message indicating that the image transfer protocol is not executable,
   wherein, after the NFC control unit has transmitted the message to said another communication apparatus, the wireless LAN communication unit communicates with said another communication apparatus using the image transfer protocol included in the message to transmit image data, without executing a service discovery.

20. The non-transitory computer-readable storage medium according to claim 19, wherein the message includes information indicating a plurality of communication protocols.

21. The non-transitory computer-readable storage medium according to claim 19, wherein the message includes information indicating a role of the communication apparatus in executing the image transfer service using the image transfer protocol.

* * * * *